(12) United States Patent
Smith et al.

(10) Patent No.: US 8,851,813 B2
(45) Date of Patent: *Oct. 7, 2014

(54) VARIABLE GRIP BLIND RIVET

(71) Applicant: Newfrey LLC, Newark, DE (US)

(72) Inventors: Daniel Robin Smith, Kidderminster (GB); Steven Victor Jones, Birmingham (GB); Graham Frank Harry Williams, Walsall (GB); Harold Martin Bone, Aldridge (GB); John Davies, Birmingham (GB); David John Brookes, Sutton Coldfield (GB)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,995

(22) Filed: Jun. 21, 2013

(65) Prior Publication Data

US 2013/0287516 A1    Oct. 31, 2013

Related U.S. Application Data

(63) Continuation of application No. 12/850,114, filed on Aug. 4, 2010, now Pat. No. 8,491,243.

(30) Foreign Application Priority Data

Feb. 4, 2008  (GB) .................................. 0801996.0
Feb. 21, 2008 (GB) .................................. 0803118.9
Jan. 7, 2009  (WO) ................. PCT/GB2008/050824

(51) Int. Cl.
*F16B 13/04*   (2006.01)
*F16B 19/10*   (2006.01)

(52) U.S. Cl.
CPC ................................. *F16B 19/1054* (2013.01)
USPC .................. 411/43; 411/38; 411/46; 411/509

(58) Field of Classification Search
USPC ........... 411/34, 38, 39, 43–46, 60.1, 501, 509
See application file for complete search history.

(56) References Cited

U.S. PATENT DOCUMENTS

| 2,371,423 | A | * | 3/1945  | Buchet ............................ 411/45 |
| 3,491,649 | A | * | 1/1970  | Smouton et al. ................ 411/43 |
| 4,958,971 | A | * | 9/1990  | Lacey et al. ..................... 411/38 |
| 6,004,086 | A | * | 12/1999 | Gand et al. ...................... 411/38 |

* cited by examiner

*Primary Examiner* — Roberta Delisle
(74) *Attorney, Agent, or Firm* — Kofi Schulterbrandt; Michael P. Leary

(57) ABSTRACT

A variable grip blind rivet has a rivet body with a first shank adapted to be inserted into a hole in a workpiece and having an axial bore, and a flange at a first end of the first shank for abutting the workpiece when the first shank is inserted into the hole in the workpiece. A mandrel has a head, for engaging a second end of the first shank, and a second shank adapted to extend through the axial bore. The head has an abutment portion for abutting the first end of the first shank. At least one protrusion adjacent the abutment portion defines a recess for receiving the first end of the first shank during setting of the rivet.

12 Claims, 3 Drawing Sheets

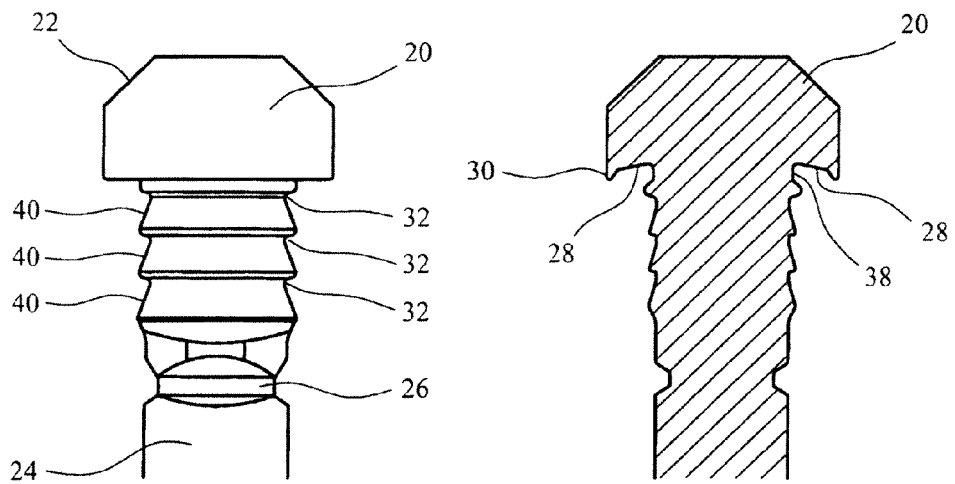
FIG. 2
FIG. 4
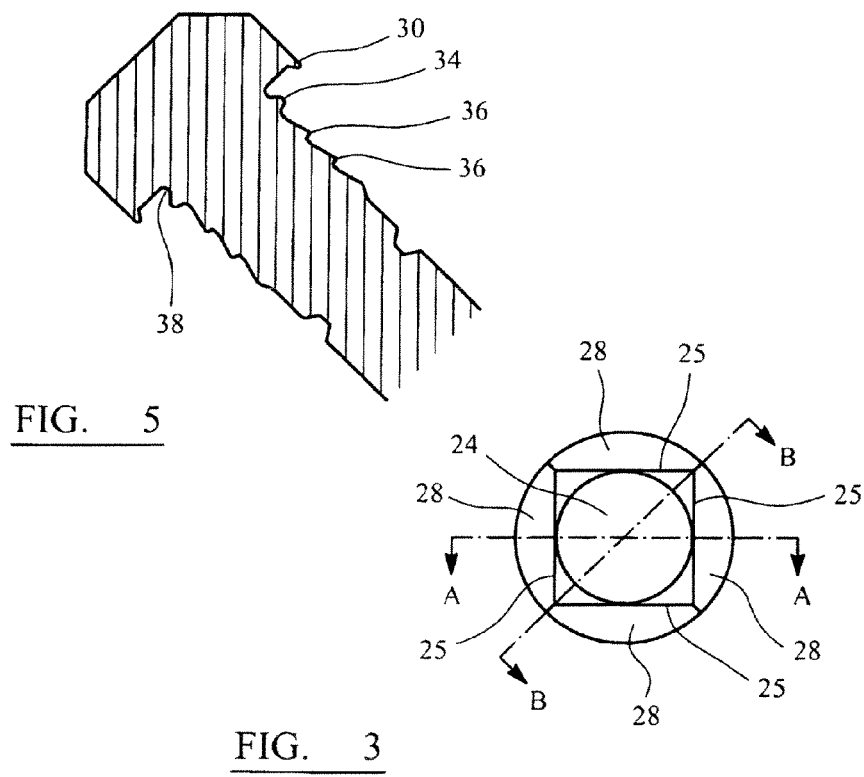
FIG. 5
FIG. 3

VARIABLE GRIP BLIND RIVET

CROSS-REFERENCE TO RELATED APPLICATIONS

This application claims the benefit of U.S. application Ser. No. 12/850,114, filed Aug. 4, 2010, PCT Application No. PCT/GB2008/050824, filed Jan. 7, 2009, Great Britain Application No. 0801996.0, Filed Feb. 4, 2008 and Great Britain Application No. 0803118.9, Filed Feb. 21, 2008. The disclosure of the above-referenced application is incorporated herein by reference.

The present invention relates to blind rivets.

Blind rivets are used in a variety of applications, from securing thin sheets to relatively thick components, and in a variety of materials, ranging from steel to plastics. The blind rivet enables lower cost assembly to be achieved, but also contributes to the strength and integrity of the resulting joint or fixing. For example, if a pair of workpiece sheets to be joined are slightly bowed, the rivet needs to clamp the sheets together.

A blind rivet is generally required to have high shear strength, and to expand into any clearance between the rivet body and a hole in the workpiece into which the rivet is inserted, in order to prevent the sheets of the workpiece from fretting under applied vibrations or oscillating applied loads. This is especially important in the automotive industry.

It is also generally required that the rivets when set should have a single roll-type bulged setting on the blind side of the workpiece, giving an increased tensile resistance to applied loading, while providing an aesthetic appearance.

In addition, it is generally desirable that the mandrel of the rivet break flush in the region of the rivet flange, contributing to an increase in the shear resistance of the joint. In order to achieve these requirements, especially in the case of higher strength blind rivets, the mandrel head is required to be fixed to the tail end of the rivet body on assembly and to remain in place during and after setting, thus contributing to the resistance to moisture ingress through the bore of the rivet body. In addition, by securing the mandrel head in the rivet body, rattling of the mandrel head within the set rivet is avoided.

EP 0677666 discloses a blind rivet having a recess beneath the mandrel head of the rivet. The tail end of the rivet body is crimped into an elliptically shaped recess beneath the mandrel head, and a further indentation is provided near to a flange portion of the rivet body.

GB 402813 shows a blind rivet having a mandrel head having a bevelled surface beneath the head. This rivet suffers from the drawback that it has a relatively narrow grip range.

GB 2231932 shows a blind rivet having a mandrel provided with grooves beneath its head. On assembly of the rivet, the tail of the rivet body is swaged into the grooves to retain the mandrel in place during manufacture. As the mandrel stem is pulled to set the rivet, that part of the rivet body swaged to the mandrel beneath the mandrel head bulges and begins to be forced outwards and out of engagement with the grooves in the mandrel stem. As the bulging process proceeds with setting, and the mandrel continues to move through the rivet body, the mandrel grooves then move into engagement with the internal bulge bore and the mandrel is locked in place. However, this rivet suffers from the drawback that there is often insufficient engagement of the mandrel to the rivet body to prevent movement of the mandrel head relative to the rivet body. In addition, when set in minimum grip thickness, this rivet has the disadvantage of providing a multi-fold rather than a single roll-type setting.

U.S. Pat. No. 6,004,086 discloses a blind rivet in which the mandrel is provided with grooves beneath the mandrel head. This rivet suffers from the drawback that if the rivet body is formed from stronger material such as steel, the higher setting loads required to set the rivet cause the mandrel head to be pulled into the rivet body before setting is complete.

EP 1106845 discloses a blind rivet having a recess beneath the mandrel head, into which the tail end of the rivet body is formed. This rivet suffers from the drawback that the setting load for certain materials such as steel is high and as the maximum load is approached, the end of the rivet body deforms and the internal bore moves away from the recess formed below the mandrel head. This causes a gap to form between the recess and the rivet body, which enables the mandrel head to move relative to the rivet body when the mandrel breaks.

GB 2416575 discloses a blind rivet in which a series of annular grooves are provided beneath the mandrel head. Although this type of rivet provides an adequate grip range, the load required to set the rivet is high compared with other blind rivets, as a result of which the mandrel head tends to loosen under recoil forces as the mandrel breaks at completion of setting of the rivet.

It can therefore be seen that all of the above rivets suffer from the drawback that it is difficult to secure the mandrel head in the rivet body to a sufficient extent during setting of the rivet. Preferred embodiments of the present invention seek to overcome one or more of the above disadvantages of the prior art.

According to the present invention, there is provided a rivet comprising:

a rivet body having a first shank adapted to be inserted into a hole in a workpiece and having an axial bore therethrough, and a flange at a first end of the first shank for abutting the workpiece when the first shank is inserted into the hole in the workpiece; and a mandrel having a head, for engaging a second end of the first shank, and a second shank adapted to extend through the axial bore and to be pulled by a tool to set the rivet, wherein the head has an abutment portion for abutting the first end of the first shank, and the second shank has a first reduced diameter portion adapted to break when a predetermined tensile is loaded applied thereto during setting of the rivet, and at least one protrusion adjacent said abutment portion for defining a recess for receiving the first end of the first shank during setting of the rivet.

By providing at least one protrusion adjacent the abutment portion for defining a recess for receiving the first end of the first shank during setting of the rivet, this provides the advantage of more securely retaining the mandrel head in the rivet body during setting of the rivet, which prevents movement of the mandrel head relative to the rivet body and prevents subsequent rattling of the mandrel head in the rivet body after setting of the rivet.

In a preferred embodiment, the rivet body is mounted to the mandrel and has a second reduced diameter portion adjacent the first end of the first shank, and a third reduced diameter portion adjacent the second end of the first shank.

This provides the advantage of providing a barrel shaped portion of the rivet body, which assists bulging of the rivet body during setting of the rivet.

The rivet body may have an increased diameter portion between said second and third reduced diameter portions, wherein, in a plane through and parallel to the longitudinal axis of the rivet body, the angle between a line connecting the region of maximum external diameter with at least one of the regions of minimum external diameter and the longitudinal axis of the rivet body is between 1.0 degree and 1.9 degree.

The rivet may further comprise at least one first groove on said second shank for receiving part of said second shank to define said third reduced diameter portion.

At least one said first groove may define a respective first surface inclined at a first acute angle relative to the longitudinal axis of the second shank.

At least one said first acute angle may be between 10 degrees and 20 degrees relative to the longitudinal axis of the second shank.

The portions of reduced diameter of the rivet body may be arranged on opposite sides of the first reduced diameter portion when the rivet is assembled.

The first reduced diameter portion may be defined by a plurality of indentations.

The abutment portion may comprise at least one second surface inclined at a respective second acute angle to the longitudinal axis of the second shank.

At least one said second acute angle may be between 73 degrees and 78 degrees relative to the longitudinal axis of the second shank.

The abutment portion may further comprise a lip arranged radially outwards of the or each said first surface, wherein the lip defines a respective third surface adjacent each said second surface, and wherein the or each said third surface is inclined at a respective third acute angle, smaller than the corresponding said second acute angle, relative to the longitudinal axis of the second shank.

At least one said protrusion may comprise a respective first rib.

The mandrel head may have at least one fourth surface inclined relative to the longitudinal axis of the second shank for assisting insertion of the rivet into a hole in the workpiece.

A preferred embodiment of the invention will now be described, by way of example only and not in any limitative sense, with reference to the accompanying drawings, in which:

FIG. 2 is a side elevation view of a head of a mandrel of the rivet of FIG. 1;

FIG. 3 is a cross sectional view from below of the mandrel head of FIG. 2;

FIG. 4 is a cross sectional elevation view along the line A-A in FIG. 3;

FIG. 5 is a cross sectional elevation view along the line B-B in FIG. 3; and

Figure 1:
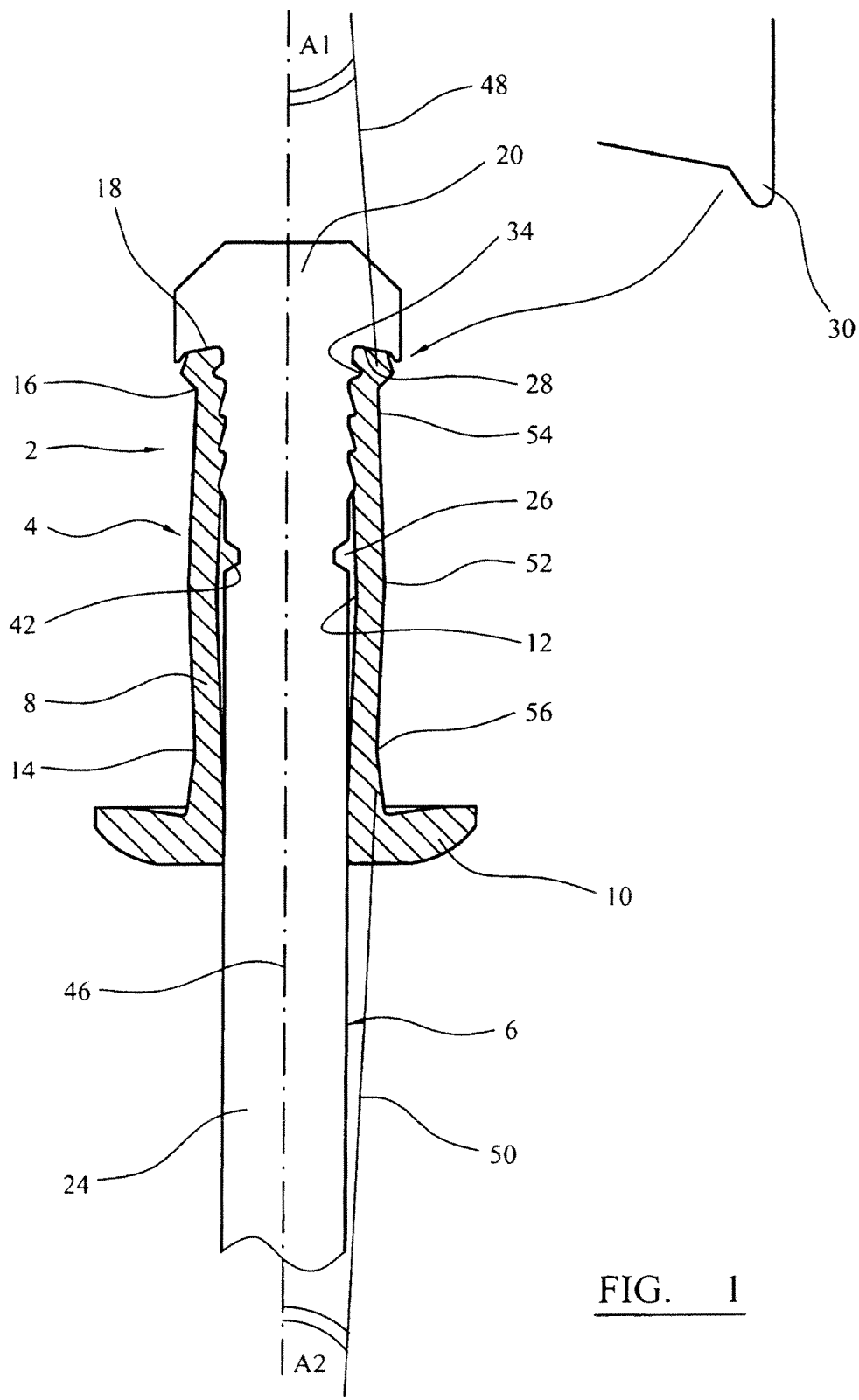
FIG. 1 is a cross sectional elevation view of an assembled blind rivet embodying the present invention.

FIG. 1 shows a cross sectional elevation view of an assembled blind rivet 2 embodying the present invention. The rivet 2 has a rivet body 4 mounted to a mandrel 6, the rivet body having a first shank 8 and an enlarged diameter flange portion 10 designed to abut a workpiece (not shown) when the first shank 8 is inserted into a hole in the workpiece. A barrel portion 12 formed by two smaller diameter portions 14, 16, extends from the flange portion 10, and a tail end 18 of the rivet body 4 abuts the underside of a head 20 of the mandrel 6.

Referring to FIGS. 2 to 5, the mandrel head 20 has chamfered outer surfaces 22 to enable easy entry of the rivet 2 into a hole in the workpiece, and a second shank 24 extends from the mandrel head 20 and has a breakneck 26 formed by four indentations provided to enable the second shank 24 to break when a specific tensile load applied to the mandrel 6 is exceeded.

Four inclined surfaces 28, each of which forms a tangent 25 to the shank 24 of the mandrel 6, are provided underneath the mandrel head 20, the surfaces 28 each being inclined at an angle of between 73 degrees and 78 degrees, and preferably 75 degrees, relative to the longitudinal axis of the second shank 24. A lip 30 is also provided around the mandrel head 20 to provide resistance to the tendency of the rivet body material to move around the mandrel head 20 as the rivet is being set.

A series of grooves 32 are provided between the breakneck 26 and the mandrel head 20, the grooves 32 defining a series of annular ribs 34, 36. The uppermost rib 34 forms a cavity 38 between the mandrel head 20 and the second shank 24, into which material of the rivet body 4 is locked and remains locked during and after the setting process. The presence of the uppermost rib 34 counteracts the tendency for the mandrel head 20 to move inside the rivet body 4 as the mandrel 6 breaks or to move upwards relative to the rivet body 4 under recoil forces caused by the breaking of the mandrel 6.

Other than the uppermost rib 34, each of the ribs 36 has an inclined surface 40 inclined at between 10 degrees and 20 degrees relative to the longitudinal axis of the mandrel shank 24, but preferably 15 degrees.

In order to form the assembled rivet 2, the rivet body material is swaged into the grooves 32 in order to create the upper reduced diameter portion 16, the lower reduced diameter portion 14 is formed, and the formation of the reduced diameter portions 14, 16 causes a slight bow of the rivet body 4 to form the barrel portion 12 and induce a slight gap 42 (FIG. 1) between the bore of the rivet body 4 and the shank 24 of the mandrel 6. The angle of the bow of the outer surface of the rivet body 4 (i.e. in a plane through and parallel to the longitudinal axis 46 of the rivet body 4, the angle $A_1$ or $A_2$ between a respective line 48, 50 connecting the region of maximum external diameter 52 with a respective one of the regions of minimum external diameter 54, 56 and the longitudinal axis 46 of the rivet body 4) is between 1.0 degree and 1.9 degree and is preferably 1.5 degree.

Figure 6:
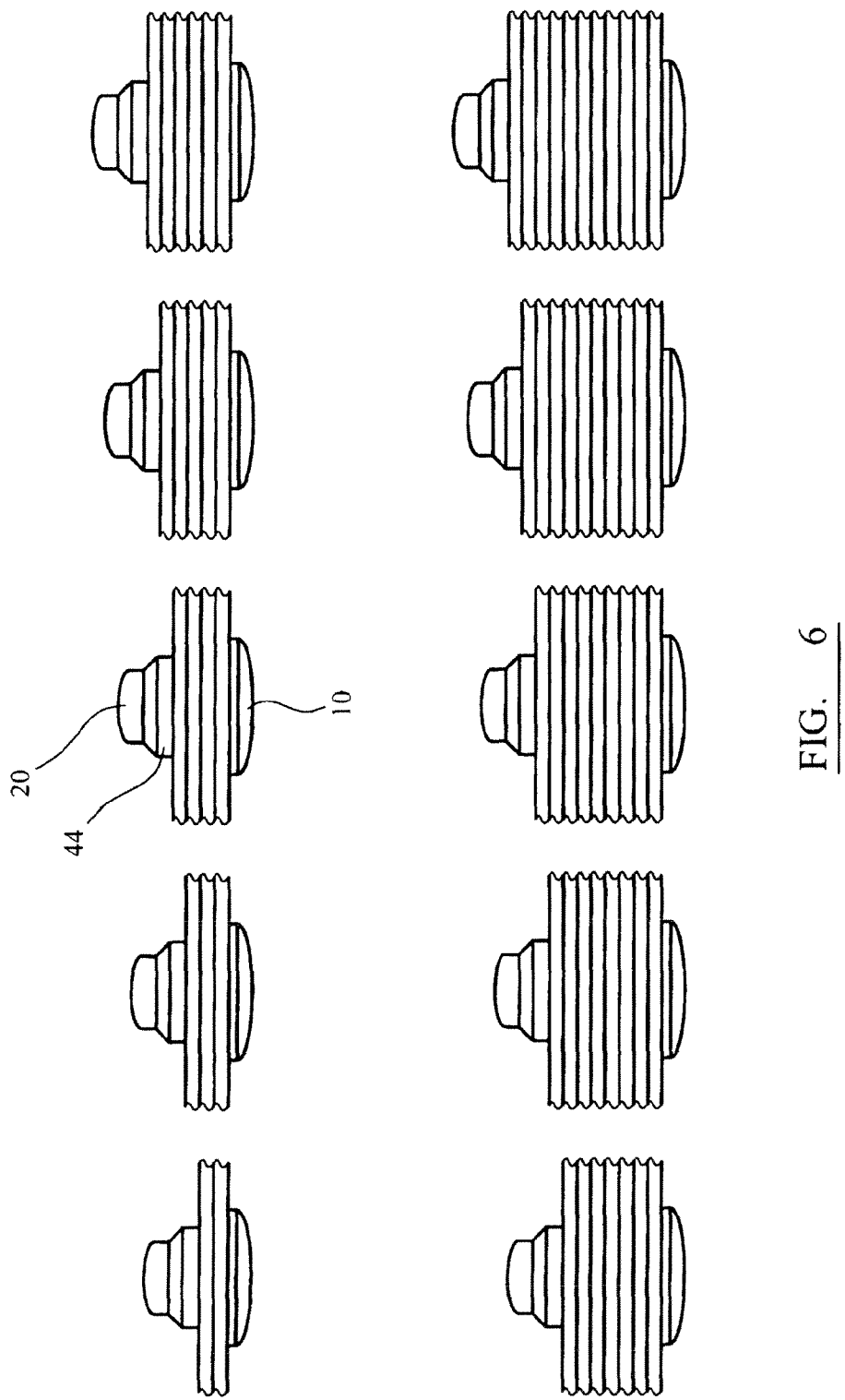
FIG. 6 illustrates the rivet of FIG. 1 set at various thicknesses.

In order to set the rivet 2, the shank 24 of the mandrel 6 is pulled by means of a setting tool (not shown) while the flange 10 is supported by a nosepiece of the setting tool. As the shank 24 of the mandrel 6 is pulled, the rivet body 4 bulges, shortens in length to fill the hole in the workpiece, and then collapses to give a blind side bulge 44, as best seen in FIG. 6. Since the bulging or collapse of the rivet body 4 occurs nearer to the end of the body than other types of rivet, the bulge is small, but the bulge causes the body material to move away from engagement with the grooves 32 in the mandrel shank 24. However, the body material is retained in the recess 38 beneath the mandrel head 20 to lock the mandrel 6 to the rivet body 4 so that the mandrel head 20 and rivet body 4 are more securely attached to each other during and after setting of the rivet. In this way, subsequent rattling of the rivet is avoided, and the integrity and strength of the rivet joint is improved.

It will be appreciated by persons skilled in the art that the above embodiment has been described by way of example only, and not in any limitative sense, and that various alterations and modifications are possible without departure from the scope of the invention as defined by the appended claims.

The invention claimed is:

1. A rivet for joining parts of a workpiece defining a hole when the rivet is pulled by a tool to set the rivet by applying a predetermined tensile load thereto, the rivet comprising:
a rivet body including a first shank defining an axial bore therethrough, the first shank having a first end and a second end, and a flange is located at the first end of the first shank, the rivet body adapted to be inserted into the hole in the workpiece such that the flange abuts the workpiece when the first shank is inserted into the hole in the workpiece;

a mandrel including a head, with an abutment portion for abutting the second end of the first shank, and a second shank adapted to extend through the axial bore and to be pulled by the tool, and the second shank has a first reduced diameter portion adapted to break at the predetermined tensile load, and wherein the second shank further includes at least one protrusion adjacent said abutment portion for defining a recess for receiving the first end of the first shank during setting of the rivet; and wherein the at least one protrusion has an inclined surface at an angle greater than 20° from the longitudinal axis of the rivet.

2. A rivet according to claim 1, wherein the rivet body is mounted to the mandrel and includes a second reduced diameter portion adjacent the first end of the first shank, and a third reduced diameter portion adjacent the second end of the first shank.

3. A rivet according to claim 2, wherein the rivet body includes an increased diameter portion located between the second reduced diameter portion and the third reduced diameter portion, and the increased diameter portion includes a region of maximum external diameter, and the second reduced diameter portion and the third reduced diameter portion each include a region of minimum external diameter, and an imaginary line connecting the region of maximum external diameter with at least one of the regions of minimum external diameter forms with a longitudinal axis of the rivet body an angle in the range of 1.0 degree to 1.9 degree.

4. A rivet according to claim 3, wherein the second reduced diameter portion and the third reduced diameter portion of the rivet body are arranged on opposite sides of the first reduced diameter portion of the mandrel.

5. A rivet according to claim 2, wherein the second shank further includes an annular rib, and the annular rib and the second shank define a first groove and the rivet body is compressed into the first grove to form the third reduced diameter portion.

6. A rivet according to claim 5, wherein the annular rib includes a first surface inclined at a first acute angle relative to a longitudinal axis of the second shank.

7. A rivet according to claim 6, wherein the first acute angle is between 10 degrees and 20 degrees.

8. A rivet according to claim 1, wherein the first reduced diameter portion is formed by a plurality of circumferentially arranged indentations defined by the second shank.

9. A rivet according to claim 1, wherein the abutment portion includes a second surface inclined at a second acute angle relative to a longitudinal axis of the second shank.

10. A rivet according to claim 9, wherein the second acute angle is between 73 degrees and 78 degrees.

11. A rivet according to claim 9, wherein the abutment portion further comprises a lip arranged radially outwards of the second surface, wherein the lip defines a third surface adjacent the second surface, and wherein the third surface is inclined at a third acute angle, smaller than the second acute angle, relative to the longitudinal axis of the second shank.

12. A rivet according to claim 1, wherein the mandrel head includes a chamfered surface inclined relative to a longitudinal axis of the second shank for assisting insertion of the rivet into the hole in the workpiece.

* * * * *